June 11, 1929.  F. C. McELROY  1,716,595
SWITCH DEVICE FOR VEHICLE DIRECTION SIGNALS
Filed March 14, 1927  2 Sheets-Sheet 1
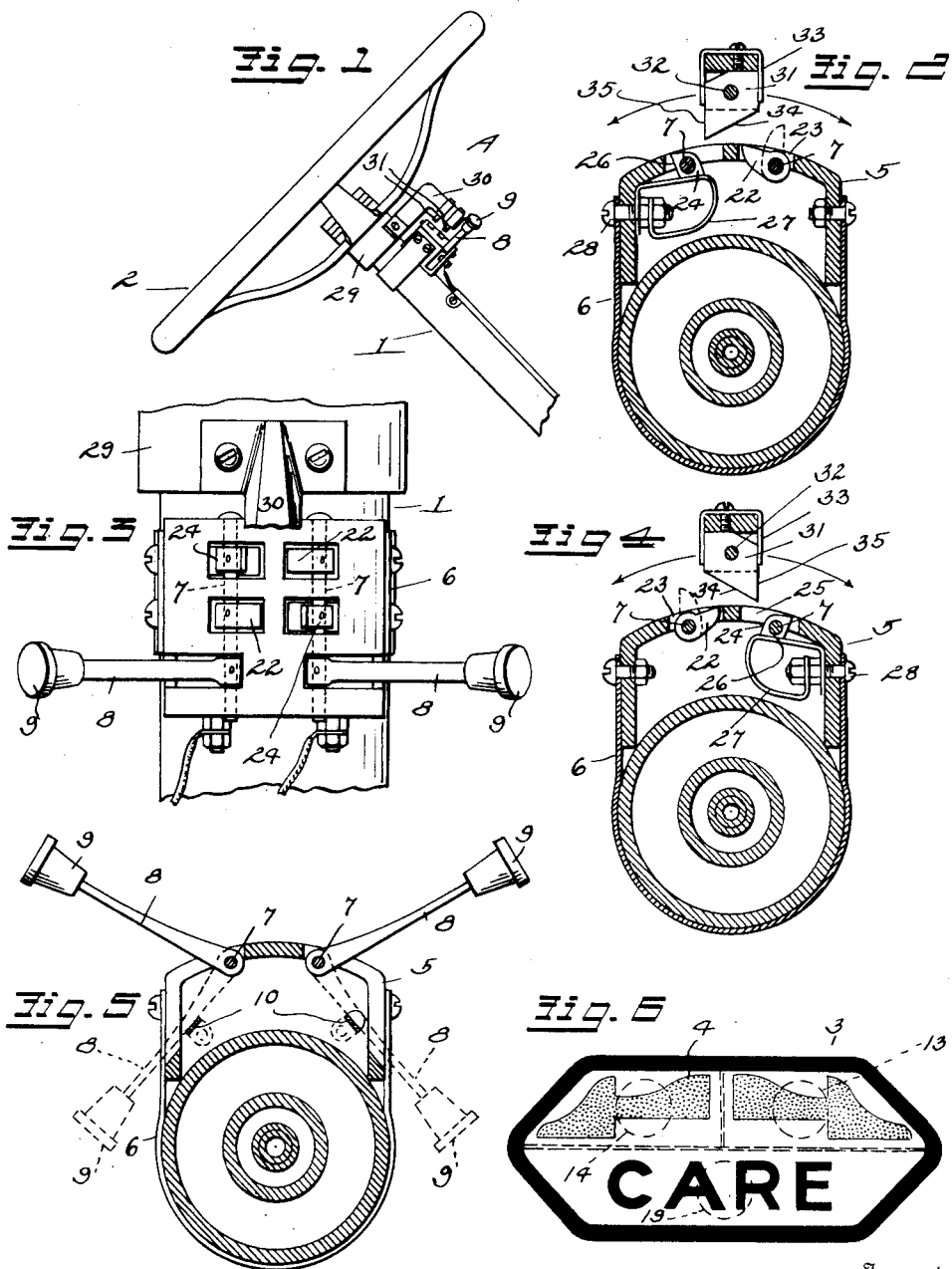
Inventor
F. C. McElroy
By W. S. McDowell.
Attorney

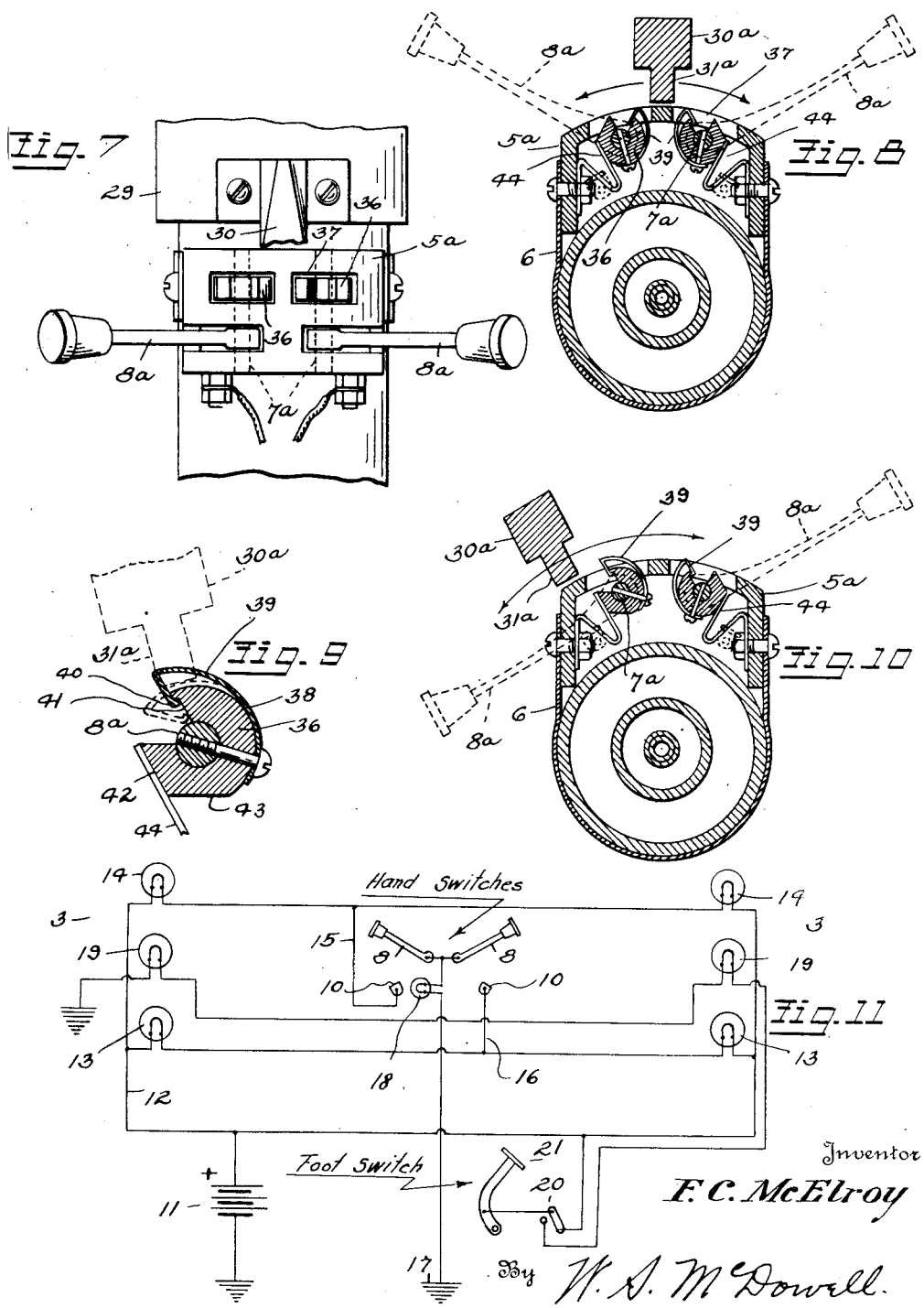

Patented June 11, 1929.

1,716,595

UNITED STATES PATENT OFFICE.

FRANK C. McELROY, OF COLUMBUS, OHIO.

SWITCH DEVICE FOR VEHICLE DIRECTION SIGNALS.

Application filed March 14, 1927. Serial No. 175,218.

This invention relates to improvements in switch devices for vehicle direction signals, and more particularly to signalling devices of the electrically operated type and adapted for application upon the front and rear of a motor vehicle for the purpose of providing illuminated indicia for denoting a contemplated change in the direction of travel which the vehicle is pursuing, in order to provide for more orderly and systematized communications or transmission of intelligence between adjacent drivers or other observers, to the end of minimizing confusion and the frequent accidents which occur when motor vehicles are turned sharply to the right or left of a given direction of travel or when such changes in speed are made.

The principal object of the invention resides in the provision of a semi-automatic switch mechanism which is adapted to be carried in connection with the steering post or column of a motor vehicle, and wherein provision is made for manually setting a signal or given set of signals prior to the time when the intended maneuver is made, and wherein the construction of the switch mechanism is such that following the execution of the turn and the subsequent restoration of the vehicle to a straight ahead path of travel the direction signal or signals will be released automatically or extinguished by the mere turning of the steering wheel and without any other control on the part of the operator.

Another object of the invention rests in a switch mechanism of this character wherein the various signals may be made by selective manual operations and automatically broken by means of a trip mechanism mounted in connection with the steering wheel, the operation of the trip mechanism being such that when the steering wheel is turned to steer the vehicle in accordance with a given signal the latter will not be disturbed or interrupted, but when the steering wheel is reversed in rotation to restore the vehicle to its straight away path of travel the trip mechanism operates to release automatically the signal setting means and thereby extinguish the previously manually set signal.

Further objects reside in switch mechanisms of a simple compact character capable of being readily applied to standard steering wheel constructions used in connection with motor vehicles, and in the provision of a switch mechanism which may be readily operated by natural movements and readily accessible controls without interfering to any extent with the operator in the normal control of a vehicle during operation.

With these and other objects in view, as will appear as the description proceeds, the invention consists in the novel features of construction, combinations of elements and arrangements of parts hereinafter to be more fully described and pointed out in the appended claim.

In the accompanying drawing:

Figure 1 is a side elevation of the switch mechanism comprising the present invention and illustrating the application thereof to a motor vehicle steering column, Figure 2 is a transverse horizontal sectional view taken through the switch mechanism and associated steering column on the plane indicated by the line 2—2 of Figure 1, Figure 3 is a front elevation of the switch mechanism, as mounted on the steering column, Figure 4 is a horizontal cross sectional view, similar to Figure 2, but taken on the plane indicated by the line 4—4 of Figure 1, Figure 5 is a horizontal cross sectional view on the line 5—5 of Figure 3, Figure 6 is a detail view in front elevation of one of the direction signals arranged in the front and rear of an associated vehicle, Figure 7 is a front elevation of a slightly modified form of switch mechanism, showing the same mounted on the steering column, Figure 8 is a transverse sectional view on the line 8—8 of Figure 7, Figure 9 is an enlarged detail cross-sectional view of one of the trips, Figure 10 is a cross sectional view on the same plane as Figure 8, but illustrating the parts of the switch mechanism in different positions, Figure 11 is a diagrammatic view of one of the circuits utilized by the switch mechanism in controlling the illumination of the direction signals.

In accordance with the present invention use is made of an improved switch mechanism designated generally by the letter A, which is preferably mounted in connection with the steering column 1 of a motor vehicle, immediately adjacent to the steering wheel 2 arranged in the upper end of the column. The purpose of the switch mechanism is to provide for the illumination of a pair of signals 3, one of which being arranged in the front of the vehicle and the other at the rear thereof. These signals may be of any desired construction but formed preferably to include a casing divided internally into at least three compartments, each of which having an independently controlled source of light mounted therein. The front of each casing is covered by a translucent plate, which contains colored direction arrows, indicated at 4, according to the right and left, and disposed immediately to the front of the upper compartment of the casing, while the lower compartment is arranged to illuminate the word "Care," which appears on the panel at the front of the lower compartment. This arrangement has been clearly disclosed in Figure 6, although, I of course do not limit myself to the use of a specific signal of this kind but have merely given this description in order that the operation of the switch mechanism may be more clearly understood.

The switch mechanism A consists preferably of a casing 5 formed preferably from an insulating material, and in cross-section is of substantially U shaped formation. The side walls of the casing are connected with a strap 6, which surrounds the stationary outer part of the column 1 and frictionally unites the casing 5 in a stationary position upon the upper part of said column contiguous to the steering wheel.

Extending vertically through the outer wall of the casing and rotatably journaled in connection therewith is a pair of shafts 7, which carry at their lower ends a pair of fixed outwardly extending and diverging arms 8. The extreme outer ends of said arms being provided with enlarged finger engaging heads 9, which may be easily engaged by the fingers or hands of the vehicle operator and turned to assume the dotted line position shown in Figure 5. The walls of the casing 5 are cut away adjacent to the arms in order to permit of free unhindered swinging movement on the part of the latter from their circuit making and circuit opening positions. The bottom wall of the casing carries a pair of fixed contacts 10, shown especially in Figure 5, which are so positioned that when the arms are swung inwardly or downwardly to their fullest extent of movement, said contacts will be engaged by the arm to complete the circuit energizing the light sources in the upper of the compartments provided by the signal 3. The selective actuation of the arms 8 permits these light sources to be correspondingly selectively illuminated.

A simple form of circuit has been diagrammatically illustrated in Figure 11, which may be used in connection with the switch mechanism. As shown, there is employed a source of electrical energy 11 from the positive side of which extends conductors 12, which are connected with the pair of bulbs 13, used in indicating a right signal, and a corresponding pair of incandescent lamp bulbs 14 used in indicating left turn signals. From the bulbs 13 conductors 15 extend to the contacts 10 used in connection with the switch arm 18 employed for illuminating the right signal, and from the bulbs 14 corresponding conductors 16 extend to the contacts 10 which are adapted for engagement with the switch arm employed for denoting left turn signals. The arms 8 are, in turn, connected with a common ground 17 and the circuit is completed to the negative side of the battery 11. It will thus be seen that by moving the arm 8 manually the direction signal will be immediately energized to give the desired signals in ample time before the contemplated maneuver is actually effected. There may also be a telltale lamp 18 in the ground conductor 17 for the purpose of giving the operator positive notification that the direction lamps are actually burning. The lamp 19, employed for illuminating the "care" signals are automatically controlled by a switch 20. The switch 20 is connected with the foot brake pedal 21 of the motor vehicle, whereby whenever the pedal is operated to apply the vehicle brake the switch 20 will be closed and the lamp 19 illuminated. The return of the pedal to a normal position permits the switch 20 to be released so as to break the circuit in which the lamps 19 are located. This control, however, is of common form and no specific claim is made thereto hereinafter.

One of the outstanding features of the present invention is the manner of constructing and actuating the switch mechanism so that while the signals are manually set and the circuits associated therewith manually made, the breaking of said circuits and the release of the signals is effected automatically. This may be accomplished in several ways, and in the form of the invention shown in Figures 1 to 5 inclusive, the shafts 7 are each provided with fixed pawls 22, the pawl on one shaft being located above the pawl on the other shaft, and both of said pawls are mounted in recesses 23 provided in the front wall of the casing 5. In addition to the pawls 22 the shafts 7 also carry fixed locking blocks 24, which are rotatably mounted in recesses 25 provided in the front wall of the casing and disposed contiguous to the recesses 23. Each of the blocks 24 is formed to include two flat locking faces 26, which are adapted for cooperation with bowed flat springs 27 carried in connection with the fastening elements 28 which are also used in connecting the ends of the straps 6 with the casing 5. The springs normally press upon the faces 26 of said blocks so as to hold the shafts 7 against rotation in one or the other of their set positions of movement. This arrangement is such that the arms are positively moved to assume one or the other of their extreme positions and can not be freely retained in intermediate positions.

The hub 29 of the steering wheel 2 is provided with a depending bracket 30, which is arranged contiguous to the arcuate outer face of the casing 5. This bracket carries a pair of pivoted dogs 31, which are mounted to swing about the axis 32, and are normally restrained from said swinging movement by the presence of a pair of spring pressed arms 33.

In operation, assuming that the vehicle driver desires to give a signal indicating a left hand turn, the arm A at the left of the casing is moved manually from the full line position shown in Figure 5 to the dotted line position. This results in the rotation of the associated shaft 7 against the resistance offered by the spring 27 to the rotation of the block 24, but wherein after the arm has been moved for a certain distance the spring 27 will coact with the block 24 to maintain the actuated arm in engagement with its respective contact 10. During the rotation of the shaft the pawl 22 connected therewith is swung outwardly from the full to the dotted line position shown in Figure 4, where it is in a position to be engaged by the beveled surface 34 of the dog 31 which actuates the same. It will be observed that the signal to turn has been manually applied prior to the actual execution of the maneuver. Then, when the steering wheel is turned to effect the turn or change in direction, the mounting of the dog 31 and the position of its pawl 22 will be such that the dog will loosely ride over the pawl without breaking the contact manually established. Attention is called to the fact that if the steering wheel is turned more than 360 degrees in the execution of a particular turn the dog may engage with the protruding pawl for a second time but without disturbing its set position. However, after the turn has been completed and the steering wheel is turned in a reverse direction to restore the vehicle to a straight away path of travel the flat side 35 of the dog will be engaged with a correspondingly formed side of the pawl so as to rotate the latter and the shaft 7 connected therewith so that said pawl will lie within the confines of its particular recess, as disclosed in full lines in Figure 4. It should also be observed that the dog can not rotate, except in but one direction and therefore the pawl is provided with no relief and must swing to its enclosed position. This then revolves the shaft 7 against the influence of the spring 27 on its block 24 and breaks automatically the electrical connection between said arm and the contact 10, thereby extinguishing the signals. This operation also holds true in case it is desired to illuminate the bulbs 13 which are employed to indicate right turns, but in which event the arm 8 for the right signal is actuated manually rather than the other arm.

It will thus be seen that the present invention provides a simple, easily controlled and positively operating switch means permitting first of the manual setting or illumination of certain desired signals and at any desired time and, second, the automatic release of the signals or the breaking of the circuits associated therewith after the vehicle has completed the maneuver for which the signal was originally set.

In the form of the invention disclosed in Figures 7 to 10 inclusive, the casing 5$^a$ is provided with the rock shafts 7$^a$, upon which the arms 8$^a$ are mounted. Each of the shafts 7$^a$ has fixed thereto a block 36 arranged for movement within a slot 37 provided in the front wall of the casing. The block is formed to include an arcuate face 38, upon which is applied in a fixed manner a movable leaf spring 39. The free extremity of the spring 39 is resiliently spaced from the arcuate face 38, and is provided with an inturned portion 40 arranged for movement within a recess 41 provided in the block 36, and which recess permits the free end of the spring to be pressed inwardly into engagement with the arcuate face, as shown by dotted lines in Figure 9. The block 36 is further formed to include flat faces 42 and 43, which are adapted to engage with the free end of a positioning spring 44, cooperatively mounted within the casing for engagement with the blocks of each shaft. As shown in Figure 8, the springs 44 engage with the faces 43 of said blocks when the arms 8$^a$ are normally positioned, and sufficient frictional effort is exerted on said blocks to retain the arms in these positions. However, when it is desired to make a circuit so as to set a given signal, the arms 8$^a$ are actuated as in the previously described form of the invention, so as to rotate the shafts 7$^a$ and their respective blocks 36. This brings the arms 8$^a$ into engagement with the contacts 10$^a$, completing the circuit as heretofore set forth. The arms are maintained in this circuit completing position by the engagement of the springs 44 with the faces 42, as indicated in Figure 9, wherein it will be observed that the blocks will be so positioned as to cause the free ends of the springs 39 to project beyond the confines or the arcuate outer surfaces of the casing 5$^a$. When thus positioned the springs 39 are in such locations as to be engaged by the depending bracket 30$^a$ of the steering wheel. The bracket 30$^a$ is provided with a rigid integral lug 31$^a$, which are so disposed that when the steering wheel is turned in a direction to effect the signal maneuver, the spring 39 is merely depressed without having any effect whatever on the position of its coacting arm 8$^a$. This permits the circuit to remain on, as well as its associated signal, while the maneuver is being made, however, upon the return of the steering mechanism to a straight ahead position, the lug 31ª will engage with the inturned portion 40 of the spring 39 so as to positively rotate the connected block and the associated arm 8ª from its circuit making to its circuit breaking position. Thus, the circuit is automatically released by the normal action of the steering wheel.

It will be seen that by the use of the construction set forth there is provided a switch mechanism of very simple form for the purpose of controlling particularly the operation of direction signals used upon motor vehicles. Practice has disclosed that it is extremely desirable in a signal of this kind to provide for its manual setting, in order that ample notice may be given adjacent observers before a change is made in the operation of the vehicle. However, it is extremely desirable to automatically release the signals, after the maneuver has been made, since the burden on the vehicle operator should be lightened as much as possible commensurate with the greatest safety and best operating conditions. For this reason I have provided for the manual setting of the signals and then their automatic release, which differs from my previous application, Serial Number 100,411, filing date April 7, 1926, wherein the signals are both automatically set and broken by the operation of the steering apparatus.

As many changes could be made in the above constructions and many apparently widely different embodiments of this invention could be made without departing from the scope thereof, it is intended that all matter contained in the above description or shown in the accompanying drawing shall be interpreted as illustrative and not in a limiting sense.

What is claimed is:

In mechanism of the character set forth, the combination with the steering column of a motor vehicle and its rotatable steering wheel of a switch casing mounted upon a stationary part of said steering column adjacent to said wheel, a pair of shafts rotatably mounted in said casing, a radially extending arm connected with each of said shafts, a circuit making device carried by said casing and arranged to be engaged by said arms when the latter occupies its active positions, a cam carried by each of said shafts and positioned in an offset relation with respect to each other, a member carried by and rotatable with the steering wheel of said column, a pair of spring pressed dogs pivoted to said member and located in the path of said cams, each of said dogs being formed with a bevel and an abrupt face and so arranged that upon the rotation of the steering wheel in a predetermined direction the abrupt face of a said dog will engage with a cam of one of said shafts to return the latter from circuit closing to circuit opening positions.

In testimony whereof I affix my signature.

FRANK C. McELROY.